United States Patent [19]
Murayama et al.

[11] Patent Number: 5,369,649
[45] Date of Patent: Nov. 29, 1994

[54] SIGNALING DATA RECEIVING AND PROCESSING UNIT PROVIDED IN A BROADBAND INTEGRATED SERVICES DIGITAL NETWORK

[75] Inventors: Masami Murayama, Yokohama; Satoshi Kakuma; Shuji Yoshimura, both of Kawasaki, all of Japan

[73] Assignee: Fujitsu Limited, Kawasaki, Japan

[21] Appl. No.: 731,332

[22] Filed: Jul. 17, 1991

[30] Foreign Application Priority Data

Jul. 17, 1990 [JP] Japan ................... 2-188362

[51] Int. Cl.$^5$ .............................................. G06F 11/10
[52] U.S. Cl. .................................. 371/37.1; 371/40.1
[58] Field of Search ............................. 371/40.1, 37.1

[56] References Cited
U.S. PATENT DOCUMENTS

| | | | |
|---|---|---|---|
| 4,953,164 | 8/1990 | Asakura et al. | 371/40.1 |
| 5,130,991 | 7/1992 | Takano | 371/37.6 |
| 5,146,461 | 9/1992 | Duschatko et al. | 371/40.1 |

Primary Examiner—Charles E. Atkinson
Attorney, Agent, or Firm—Staas & Halsey

[57] ABSTRACT

An error check of a signaling data divided into divided signaling data transferred asynchronously in a unit of cells is performed in a signaling data receiving and processing unit in a digital exchange. The exchange is connected with terminal equipment arranged in a narrow band ISDN environment in a broadband ISDN system. The error check is performed by calculating an error check code for every byte of the signaling data as it is received, accumulating the result until the cyclic redundancy code, encountered in the last byte of the signaling data, is accumulated and performing matching between the accumulated result and a constant value produced based on the CRC system. The checking is performed while the signaling data is stored in a data memory in the signaling data receiving and processing unit. The data memory provided in the signaling data receiving and processing unit has memory regions capable of storing the signaling data sent from the terminal which is allocated as needed by a central controller of the digital exchange.

12 Claims, 10 Drawing Sheets

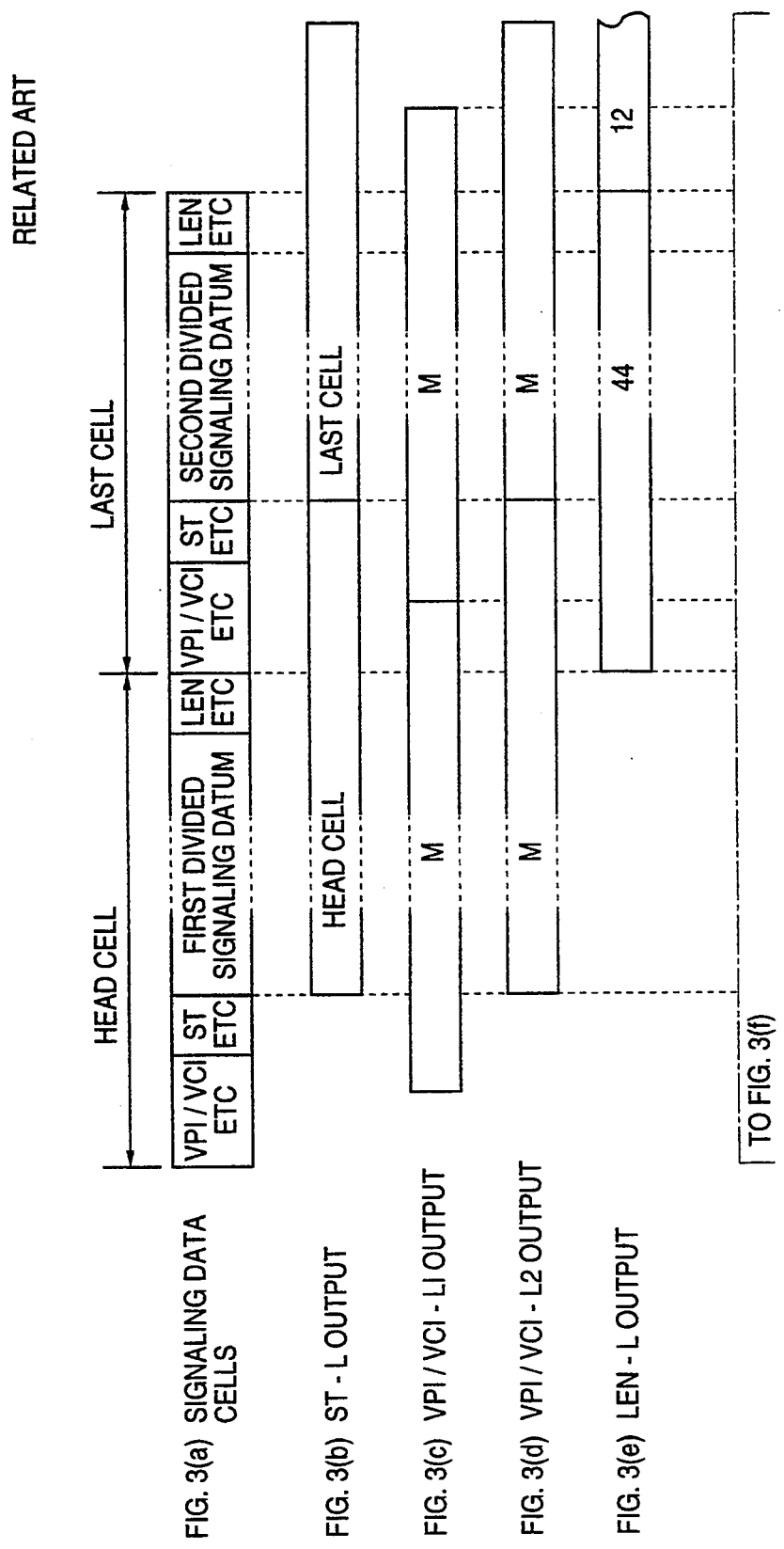

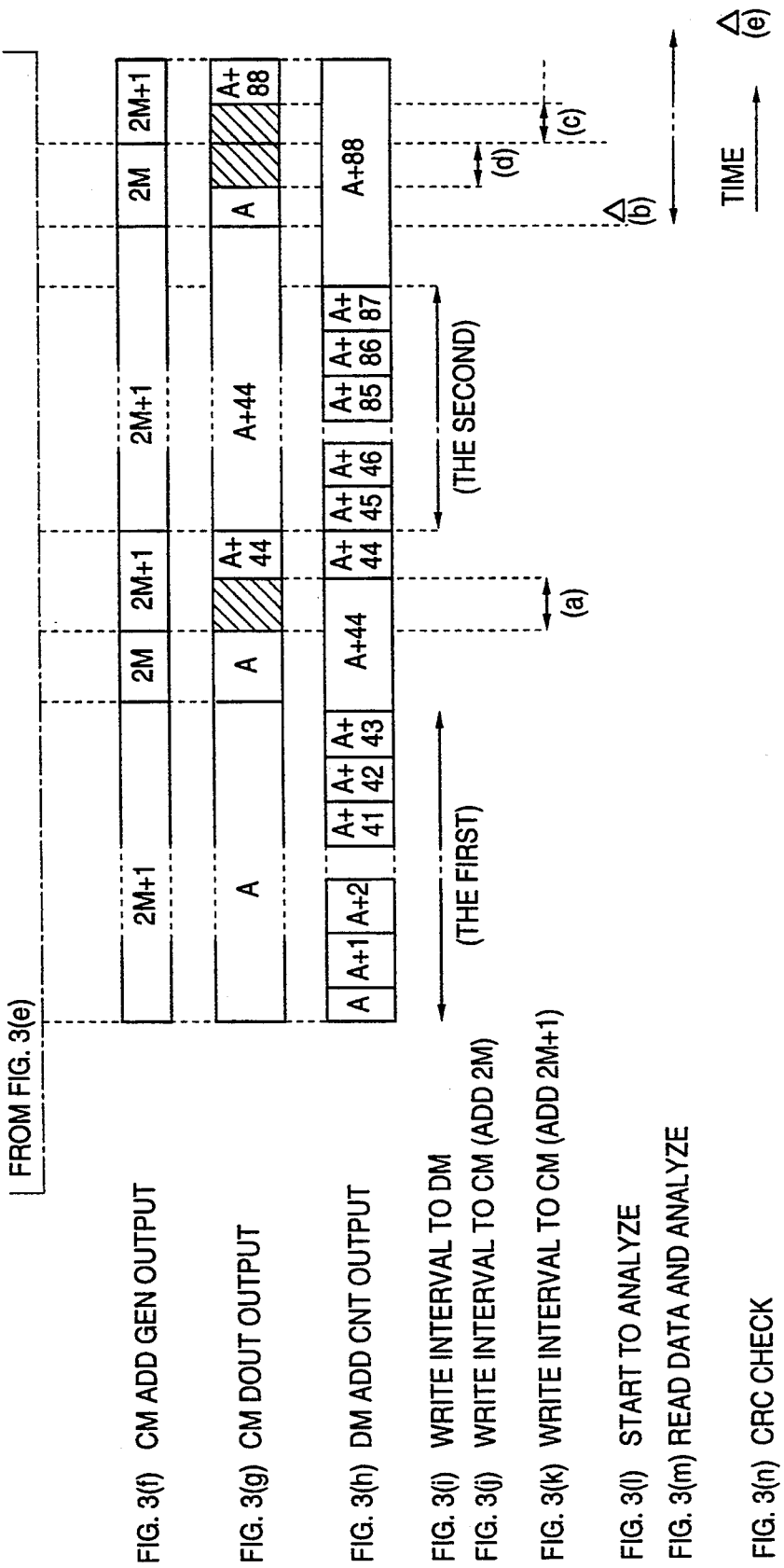

RELATED ART

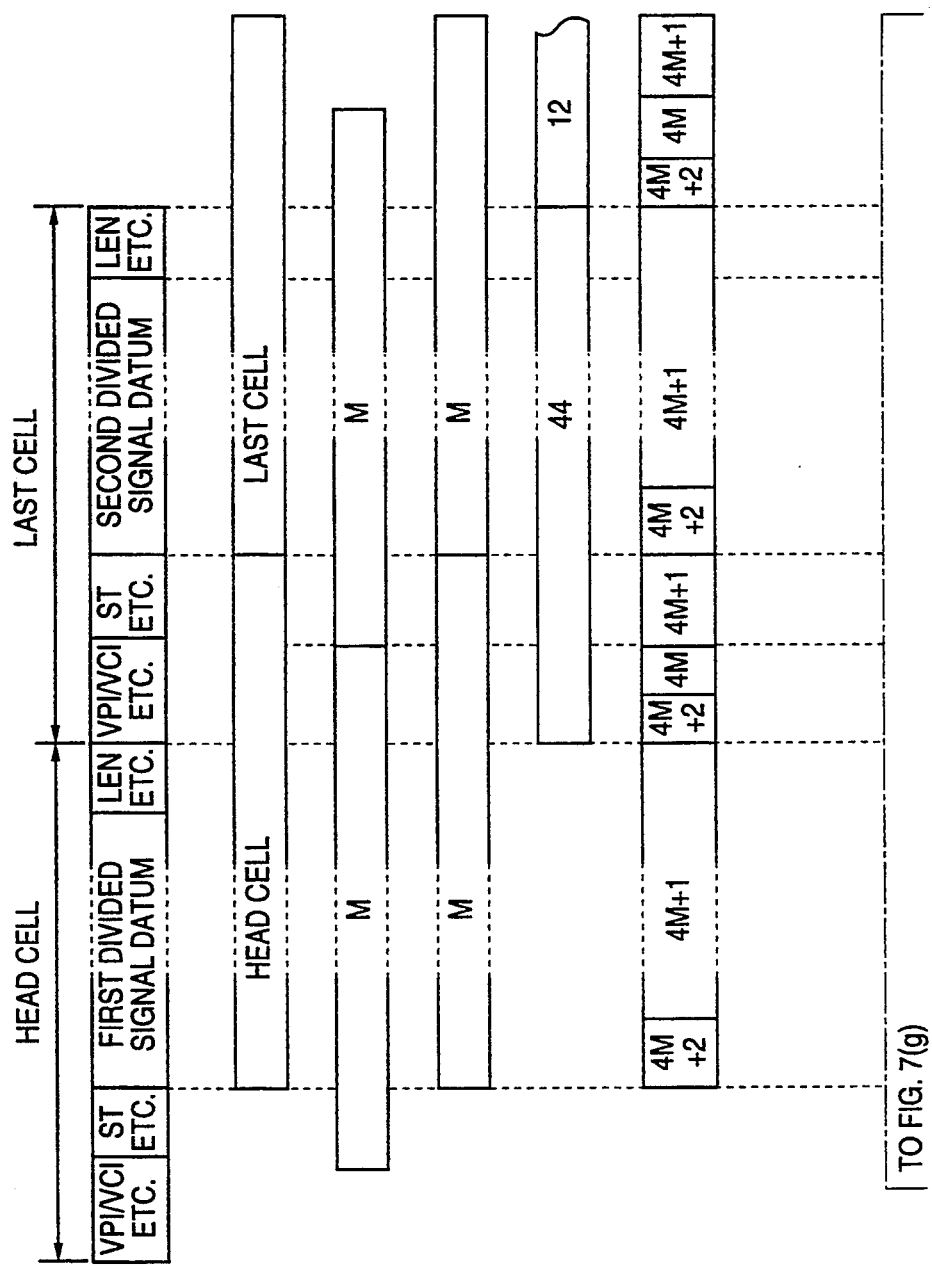

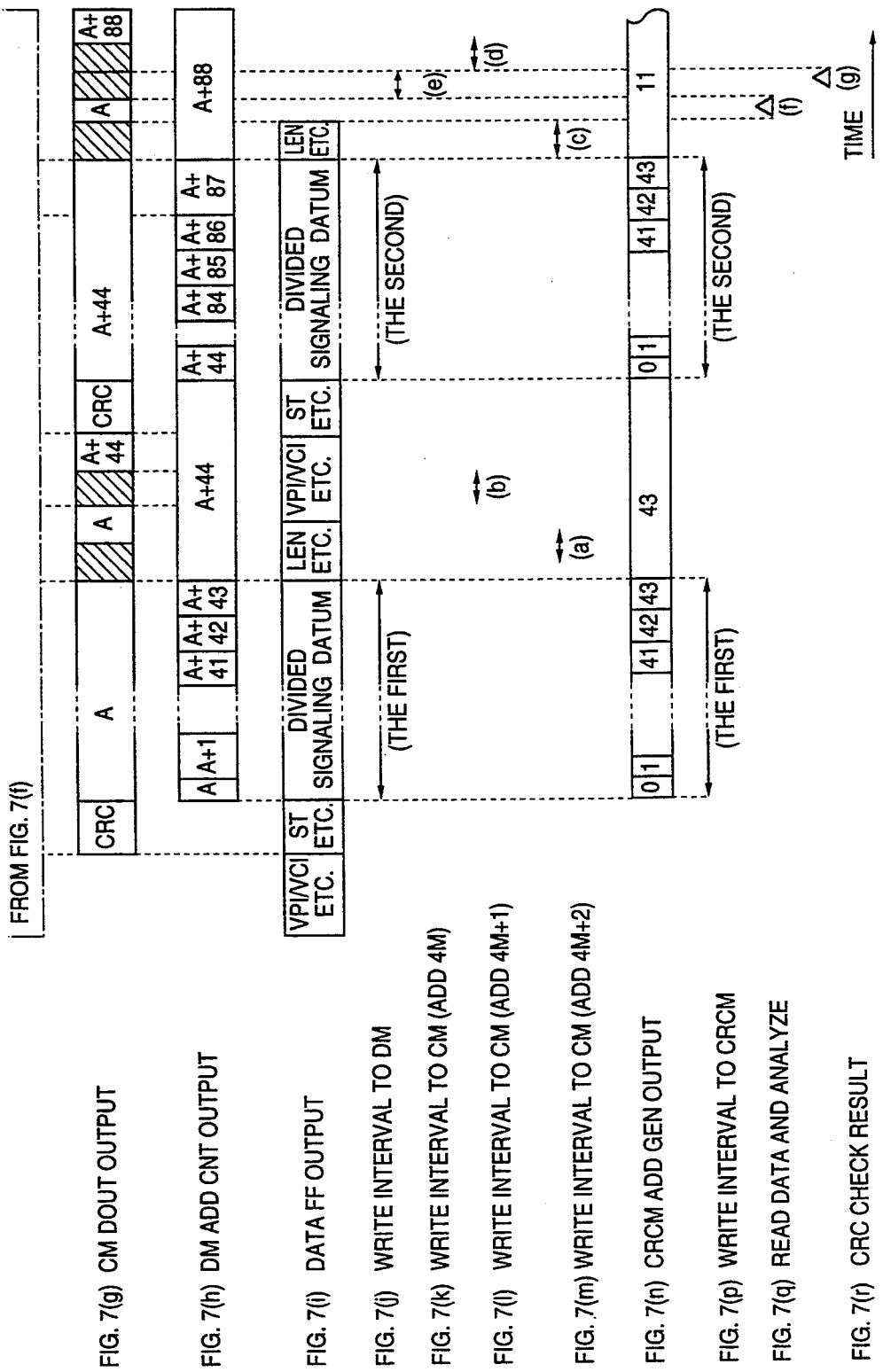

FIG. 9

| ADD | CM |
|---|---|
| 0 | DM START ADD (VPI / VCI = 0) |
| 1 | DM WORK ADD (VPI / VCI = 0) |
| 2 | CRC CAL RESULT (VPI / VCI = 0) |
| 3 | |
| 4 | DM START ADD (VPI / VCI = 1) |
| 5 | DM WORK ADD (VPI / VCI = 1) |
| 6 | CRC CAL RESULT (VPI / VCI = 1) |
| 7 | |
| ⋮ | ⋮ |
| 4M | DM START ADD (VPI / VCI = M) |
| 4M+1 | DM WORK ADD (VPI / VCI = M) |
| 4M+2 | CRC CAL RESULT (VPI / VCI = M) |
| 4M+3 | |

| ADD | CRCM |
|---|---|
| 0 | CRC CAL RESULT OF 1ST BYTE |
| 1 | CRC CAL RESULT OF 1ST AND 2ND BYTE |
| ⋮ | ⋮ |
| 43 | CRC CAL RESULT OF 1ST~44TH BYTE |

11

SIGNALING DATA RECEIVING AND PROCESSING UNIT PROVIDED IN A BROADBAND INTEGRATED SERVICES DIGITAL NETWORK

BACKGROUND OF THE INVENTION

1. Field of the Invention

The present invention relates to a signaling data receiving and processing unit provided in a broadband Integrated Services Digital Network (ISDN), and in particular, the present invention relates to a signaling data receiving and processing unit provided in a digital exchange in a broadband ISDN under circumstances that the digital exchange is connected with terminal equipment or adapters operating in a narrow band ISDN included in a data transfer system with the broadband ISDN.

At the present time, a switching network operating under an Asynchronous Transfer Mode (ATM) is intended to be used in a broadband ISDN. Because, the ATM switching network is expected to be most powerful for realizing the broadband ISDN. When the ATM switching network is used, a datum is transferred in the form of a cell having a fixed length. If the length of the datum is longer than the fixed length, the datum is divided into a plurality of divided data and transferred in a unit of a plurality of cells each including a divided datum having the fixed length. However, though the ATM switching network is provided in the broadband ISDN, there are cases where the ATM switching network is connected with terminal equipment and/or terminal adapters (TE/TA) each operating in a narrow band ISDN.

In narrow band ISDN, a datum is transferred under a signaling system such as Common Channel Signaling System (CCS) No. 7 or Link Access Procedure on the D-channel (LAPD) as provided or specified by CCITT. In accordance with such a signaling system, a signaling datum is transferred in a form of a frame having a variable length (not fixed length) including a Cyclic Redundancy Check (CRC) code placed at the end of the frame.

Therefore, as far as the ATM switching network is provided in the broadband ISDN in connection with TE/TA operating in the narrow band ISDN, the signaling data receiving and processing unit provided in the ATM switching network must support the signaling datum transferred from TE/TA under the signaling system used in the narrow band ISDN.

2. Description of the Related Art

FIG. 1 shows a typical format, which was provided or specified in 1989 by CCITT, for a cell used for transferring a signaling datum in the broadband ISDN. The cell consists of a header part, which will be simply called a "header" hereinafter, composed of 5 bytes and a payload part, which will be simply called a "payload" hereinafter, composed of 48 bytes. In the payload, there are adaptation control fields I and II each composed of 2 bytes and a signaling data field composed of the rest, 44 bytes, which is fixed in length. When the signaling datum is longer than the fixed 44 bytes, the signaling datum is divided into a plurality of divided signaling data sets in a plurality of cells respectively.

The header includes information called "VPI/VCI (Virtual Path Identifier and Virtual Channel Identifier)" informing or indicating "from which TE/TA the signaling datum comes". The adaptation control fields I includes information called "ST (Segment Type)" informing or indicating "to which cell the signaling datum belongs, a head cell, a middle cell, a last cell or a single cell". When the signaling datum has a length shorter than the 44 bytes, ST informs that the signaling datum belongs to or resides in a single cell. When the length is longer than 44 bytes and divided into two divided signaling data, ST in the first cell informs or indicates that the divided signaling datum belongs to a head cell and ST in the second cell informs or indicates that the divided signaling datum belongs to a last cell. When the signaling datum is divided into more than three divided signaling data, STs inform or indicate that the divided signaling data in the cells belong to a head cell, a middle cell or middle cells and a last cell respectively. The adaptation control fields II includes information called "LEN (Length)" informing or indicating "how many bytes are in the signaling data field".

Since the broadband ISDN is one of the new communication networks, a signaling data receiving and processing unit has not been developed as the prior art in the broadband ISDN. Therefore, a signaling data receiving and processing unit of the related art will be explained with respect to an analogy with a signaling system such as CCS No. 7 or LAPD in narrow band ISDN.

The operation of a signaling data receiving and processing unit of the related art will be explained in reference to FIGS. 2, 3, 4 and 5. FIG. 2 is a block diagram of a signaling data receiving and processing unit (SIG DATA R/P) 100 of the related art; FIG. 3 is a time chart for explaining the function of the block diagram in FIG. 2; FIG. 4 is an example of a stored state of data in a data memory (DM) 2 in SIG DATA R/P 100 in FIG. 2; and FIG. 5 is an example of a stored state of data in a control memory (CM) 4 in SIG DATA R/P 100 in FIG. 2. In FIGS. 3, 4 and 5, the same symbols as in FIG. 2 are used.

As shown in FIG. 2, SIG DATA R/P 100 belongs to a digital exchange (DEX) 300 including a well known central controller (CC) 200 and consists of a receiving block (R-BLOCK) 101 and an analyzing block (A-BLOCK) 102. The cells each including the divided signaling datum are sent from TE/TA (however, only TE will be discussed for simplicity hereinafter) to R-BLOCK 101 and stored in DM 2. The divided signaling data stored in DM 2 are read into A-BLOCK 102 and combined into a frame of the signaling datum therein. The signaling datum formed in the frame thus will be called the original signaling datum hereinafter. In A-BLOCK 102, the original signaling datum is analyzed and the analyzed result is sent to CC 200.

When the number of TE devices is "M+1" in the data transfer system and at least "n" is provided as the number of addresses for each TE in DM 2, DM 2 has memory regions for storing the divided signaling data as shown in FIG. 4, and CM 4 for controlling DM 2 has memory regions for storing control signals as shown in FIG. 5. In FIG. 5, two memory regions are provided for each VPI/VCI, corresponding to "DM start address (add)" and "DM work add" respectively for continuously storing the divided signaling data for each TE, in DM 2. That is, "DM start add" is an address used for starting to store the original signaling datum in DM 2 and "DM work add" is an address used for storing the divided signaling data into DM 2.

When cells are sent to SIG DATA R/P 100, the cells are usually sent from a TE at intervals so that other cells are sent from other TEs in between the intervals. However, in FIG. 3, the operation of SIG DATA R/P 100 is explained in a case where the cells are sent from the TE to SIG DATA R/P 100 successively without having the intervals, for purposes of simplifying the explanation. Furthermore in FIG. 3, the original signaling datum is divided into two divided signaling data, a first divided signaling datum composed of 44 bytes and a second divided signaling datum composed of 12 bytes, transferred in a unit of two cells, a first and a second cell, respectively.

When SIG DATA R/P 100 receives the first and second cells as shown in FIG. 3(a), VPI/VCIs in the first and second cells are latched or stored by a first VPI/VCI latch (VPI/VCI-L1) 61 and second VPI/VCI latches (VPI/VCI-L2) 62 arranged in series, producing a latched signal "M" respectively as shown in FIGS. 3(c) and 3(d). The output from VPI/VCI-L2 62 is sent to both a TE/TA discriminator (TE/TA DISC) 56 in A-BLOCK 102 and a control memory address generator (CM Add GEN) 5 in R-BLOCK 101. The function of TE/TA DISC 56 will be explained later. The CM Add GEN 5 is for generating control memory addresses (CM Add) to be used in CM 4. Since CM 4 is provided to store two addresses for each TE as explained in reference to FIG. 5 and "M" is input to CM Add GEN 5, CM Add GEN 5 generates two CM addresses, "2M" including "DM start Add" and "2M+1" including "DM work Add", and outputs them as shown in FIG. 3(f).

The STs in the first and second cells are latched by an S/T latch (S/T-L) 7, producing signals informing "head cell" and "last cell" for the first and second cells respectively as shown in FIG. 3(b). The LENs in the first and second cells are latched by an LEN latch (LEN-L) 8, producing signals informing "44" and "12" for the first and second cells respectively as shown in FIG. 3(e). The outputs from ST-L 7 and LEN-L 8 are sent to a data memory address recognizer (DM Add RECOG) 53 in A-BLOCK 102 as shown in FIG. 2. The function of DM Add RECOG 53 will be explained later. In the case of the first cell, when CM 4 receives CM address "2M+1" from CM Add GEN 5 at an address input terminal (Add) of CM 4, an arbitrary datum "A", which has been obtained in CM 4 when CM 4 was initialized, is output from a data output terminal (Dout) of CM 4 as shown in FIG. 3(g). The "A" output from CM 4 is sent to a data memory address counter (DM Add CNT) 3 and DM Add RECOG 53 respectively. When "A" is loaded into DM Add CNT 3, counting is advanced therein step by step as shown by "A", "A+1", "A+2", - - - , "A+43" in FIG. 3(h). During the counting, the 44-byte first divided signaling datum is written into DM 2 through a data input terminal (Din) of DM 2 in the order of "A", "A+1", "A+2", - - - , "A+43" as shown by a time interval marked "the first" in FIG. 3(i).

In the case of the second cell, the same operation as in the first cell is performed. However, CM 4 or resets the output "A" to "A+44" as shown in FIG. 3(g). This is for preventing the second divided signaling datum from erasing the first divided signaling datum stored in DM 2, when the second divided signaling datum is stored in DM 2. The renewal is performed in CM 4 at a time (a) shown in FIG. 3(k) by sending CM address "2M+1" from CM Add GEN 5 to CM 4 and feeding the output of DM Add CNT 3 back to Din of CM 4, as shown in FIG. 2. The second divided signaling datum is stored in DM 2 in the order of "A+44", "A+45", - - - and "A+87" as shown by a time interval marked "the second" in FIG. 3(i).

In the same way as renewing or updating the CM output at the time (a), in case of the second cell, the CM output is renewed or updated at a time (c) in FIG. 3. However, renewal for "DM start Add" must be performed at a time (d) before the time (c) as shown in FIG. 3(j). This is for preparing the next frame of the signaling datum. That is, if there were no renewal or update for "DM start Add" at the time (d), A-BLOCK 102 would read the signaling data of two frames when A-BLOCK 102 is triggered to analyze the signaling datum in the next frame.

After the second divided signaling datum is stored in DM 2, A-block 102 is triggered at a time (b) shown in FIG. 3(1), so as to start the analysis of the signaling datum.

As mentioned before, the outputs from ST-L 7, LEN-L 8, CM 4 and DM Add CNT 3 are sent to DM Add RECOG 53. Therefore, at the time (b), DM Add RECOG 53 recognizes the outputs from ST-L 7, LEN-L 8, CM 4 and DM Add CONT 3. Since the output from VPI/VCI-L2 62 is sent to TE/TA DISC 56, TE/TA DISC 56 discriminates TE and sends the discrimination result to a data analyzer (DATA ANA) 52 in A-BLOCK 102. Therefore, DATA ANA 52 starts to analyze the original signaling datum at the time (b). The recognition result from DM Add RECOG 53 is sent to a data address generator (DM Add GEN) 51 in A-BLOCK 102. The DM Add GEN 51 generates addresses for reading the first and second divided signaling data stored in DM 2 and applies them to DM 2 through Add of DM 2. Then, the first and second divided signaling data are read out from Dout of DM 2 to DATA ANA 52. In DATA ANA 52, information necessary to control DEX 300 is analyzed using the original signaling datum obtained by combining the divided signaling data read from DM 2 and the result is sent to CC 200. The analysis is performed during an interval shown in FIG. 3(m).

The DM Add RECOG 53 also outputs a signal necessary to trigger a CRC check timing generator (CRC TIMING GEN) 55 in A-BLOCK 102, then CRC TIMING GEN 55 produces a timing signal to perform the CRC check. Meanwhile, the CRC check is performed in a CRC checker (CRC CHK) 9. In CRC CHK 9, the well known CRC counting in performed by counting bits of the first and second divided signaling data and performing a matching operation between the counted result and the CRC code placed at the end byte of the original signaling datum, in other words, at the end byte of the second divided signaling datum in the last cell. The original signaling datum and the CRC code are sent from Dout of DM 2 as shown in FIG. 2 and the matching is performed by the timing signal from CRC TIMING GEN 55 at a time marked (e) in FIG. 3(n). The CRC check result from CRC CHK 9 is sent to an analysis judging unit (ANA JUDGE) 54 in A-BLOCK 102, for judging or determining whether the analysis is advanced. The judged result is sent to DATA ANA 52. If the result is no good (NG), DATA ANA 52 stops the analysis of the original signaling datum and also stops sending the analyzed result to CC 200.

Problems in the Related Art

The SIG DATA R/P 100 of the related art has two problems. The first problem is that DM 2 must have too many memory regions. The second problem is that the timing for obtaining the CRC check result is too late. Because the CRC matching is performed at the last byte of the signaling datum read from DM 2. Therefore, when the analysis is stopped due to the NG result of the CRC matching, the analysis is almost completed in A-BLOCK 102, which means time for analyzing the read signaling datum is substantially all wasted.

The first problem will be explained further by using an example. In the header of the cell, 3 bytes are provided for VPI/VCI. Therefore, if at least 500 addresses are required as the address number "n" for each TE in DM 2 (see FIG. 4), the following addresses are required in DM 2:

500 address X 16M (mega)=8 G (giga) address.

However, it is known at the present time that the number of TEs used is almost one thousand. In other words, the following addresses are enough for DM 2:

500 address ×1,000=500K address.

Therefore, the memory regions come to naught or are not used in DM 2.

SUMMARY OF THE INVENTION

Therefore, an object of the present invention is to decrease the memory capacity necessary for a data memory in a signaling data receiving and processing unit included in a digital exchange provided in a broadband ISDN, when the digital exchange is connected with terminal equipment or adapters operating in a narrow band ISDN environment.

Another object of the present invention is to decrease an analysis time required to analyze a signaling datum sent from the terminal equipment or adapter for sending analyzing data to a central controller of the digital exchange.

Still another object of the present invention is to reduce the manufacturing costs of the signaling data receiving and processing unit.

Yet another object of the present invention is to increase signaling data transfer speed in a data transfer system including the broadband ISDN and the narrow band ISDN.

Further another object of the present invention is to increase communication efficiency in the data transfer system.

The above objects for decreasing the memory capacity of the data memory and for reducing the manufacturing costs of the signaling data receiving and processing unit, are achieved by limiting the number of memory regions of the data memory so that the memory regions are provided only for the terminal equipment having VPI/VCIs allocated by the central controller in reply to the requirements of VPI/VCIs, from the terminal equipment. In the present invention, the memory regions are assigned based on information related to the VPI/VCIs, supplied from the central controller to the signaling data receiving and processing unit at the time when the central controller allocates the VPI/VCIs to the terminal equipment or terminal equipment units.

The above objects for decreasing the analyzing time to analyze the signaling datum and for increasing the data transfer speed and the communication efficiency are achieved by performing a CRC check at the beginning of the analysis of the signaling datum read from the data memory. Usually, the CRC check is performed using a CRC calculation on the signaling datum read from the data memory and CRC matching between the result of the CRC calculation and CRC code placed at the end or last byte of the read signaling datum. However, in the present invention, the CRC check is made by a CRC calculation performed for every byte in the signaling data and continuously during the period in which the signaling datum is stored in the data memory even though the signaling data is divided into a plurality of divided signaling data, so as to be transferred in a unit of cells, and by CRC matching performed between a value obtaining by adding the accumulated result of the CRC calculation onto the CRC code and a constant value obtained from a general feature of CRC system. When the CRC check result is no good, in the related art, the analysis of the signaling datum is stopped after the analysis is almost over. However, in the present invention, the analysis can be stopped at the beginning. From the above, it is concluded that because of the present invention, the time for performing the CRC check can be saved when a failed CRC check result is obtained.

BRIEF DESCRIPTION OF THE DRAWINGS

FIG. 3 is a time chart for explaining the signaling data receiving and processing unit of the related art;

FIG. 7 is a timing chart for explaining the signaling data receiving and processing unit embodying the present invention;

FIG. 9 illustrates a data storing state of a control memory provided in the signaling data receiving and processing unit embodying the present invention; and FIG. 10 illustrates a data storing state of a CRC code memory provided in the signaling data receiving and processing unit embodying the present invention.

DESCRIPTION OF THE PREFERRED EMBODIMENT

The preferred embodiment of the present invention will be explained with reference to FIGS. 6 to 11.

Figure 6:
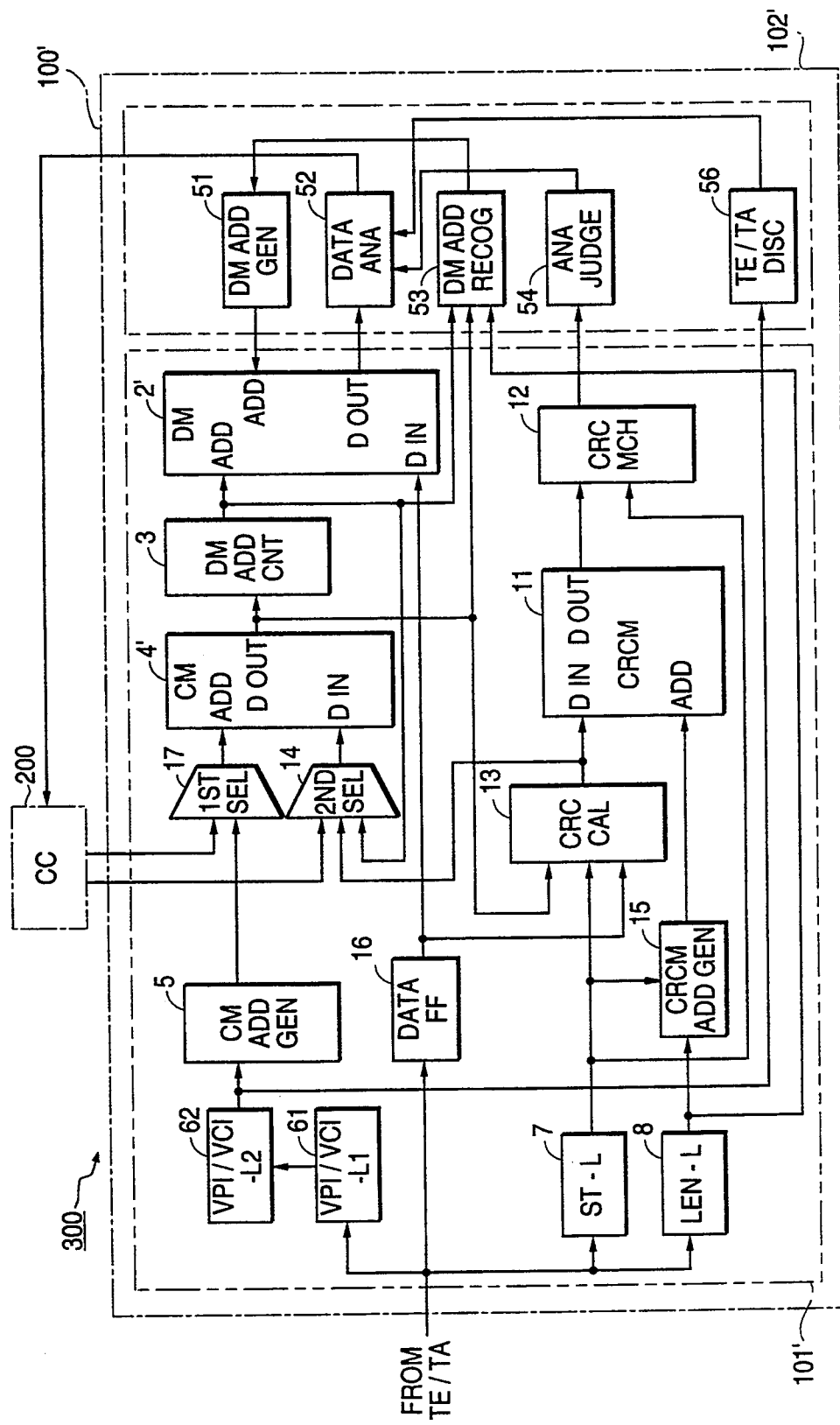
FIG. 6 is a schematic block diagram of a signaling data receiving and processing unit embodying the present invention.
Figure 8:
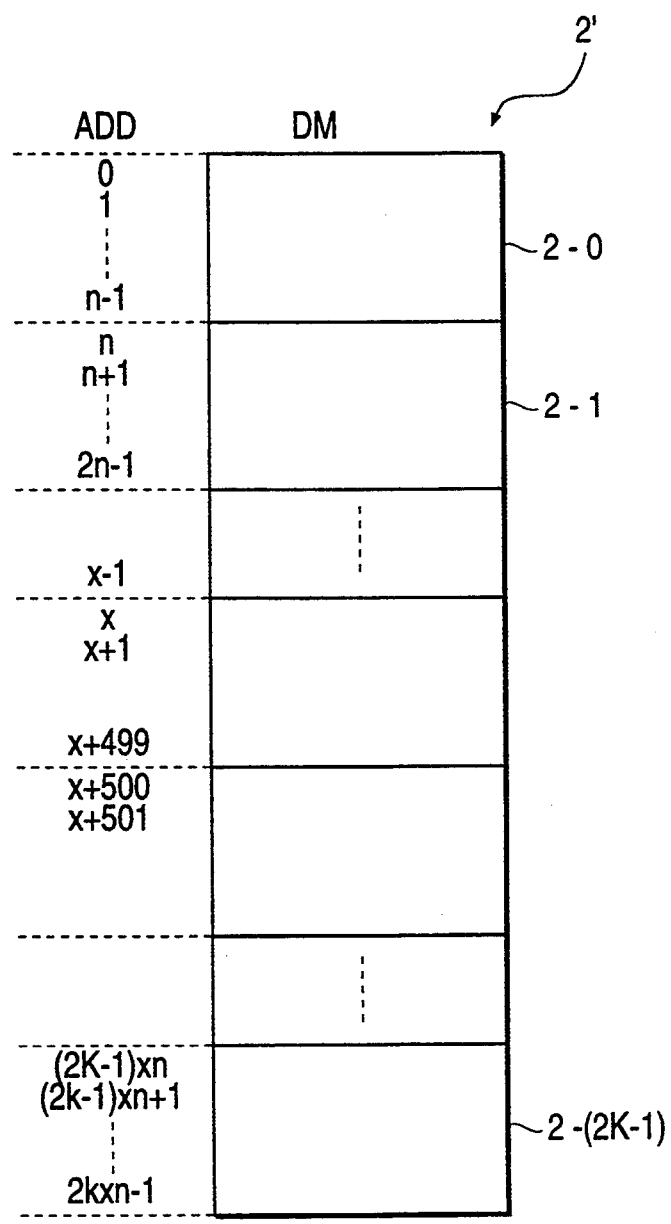
FIG. 8 illustrates a data storing state of a data memory provided in the signaling data receiving and processing unit embodying the present invention.

FIG. 6 is a block diagram of SIG DATA R/P 100' embodying the present invention. FIG. 7 is a time chart for explaining the operation of SIG DATA R/P 100' in FIG. 6; FIG. 8 illustrates an example of a stored state of data in DM 2' in SIG DATA R/P 100'; FIG. 9 illustrates an example of a stored state of data in CM 4' in SIG DATA R/P 100'; and FIG. 10 illustrates a stored state of data in a CRC code memory (CRCM) 11 in SIG DATA R/P 100' in FIG. 6. In FIGS. 6, 7, 8 and 9, the same reference symbols or numerals as in FIGS. 2, 3, 4 and 5 designate the same blocks or functions as in FIGS. 2, 3, 4 and 5, respectively.

Figure 1:
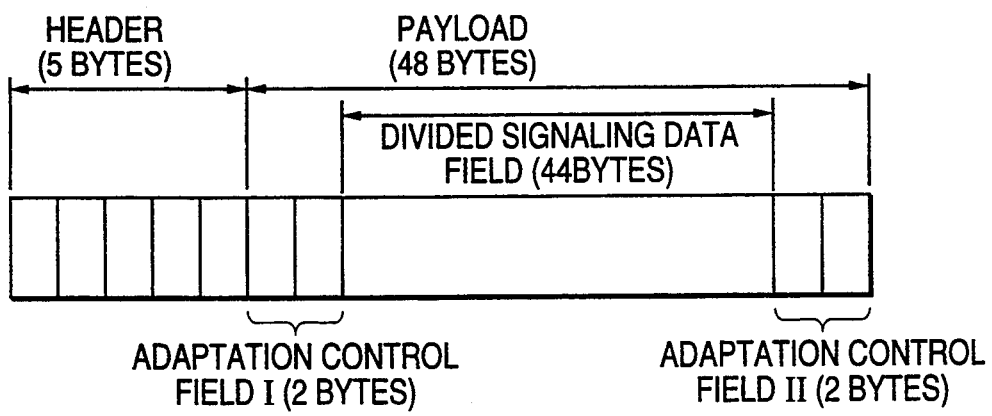
FIG. 1 is an illustration of a format of a cell used for transferring a signaling datum.
Figure 5:
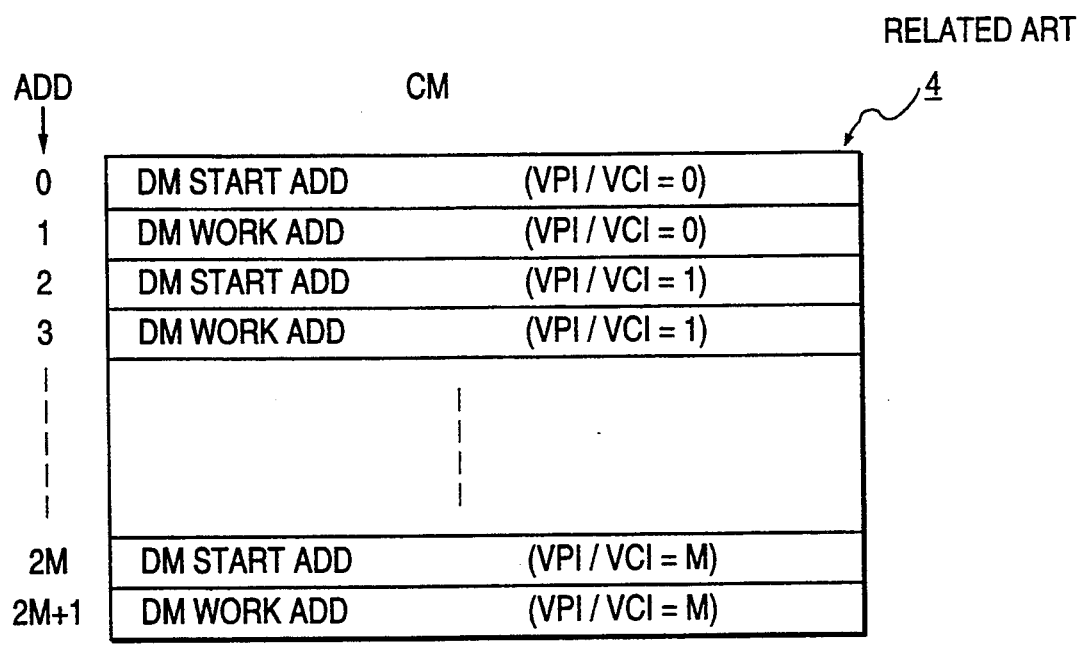
FIG. 5 illustrates a data storing state of a control memory provided in the signaling data receiving and processing unit of the related art.
Figure 2:
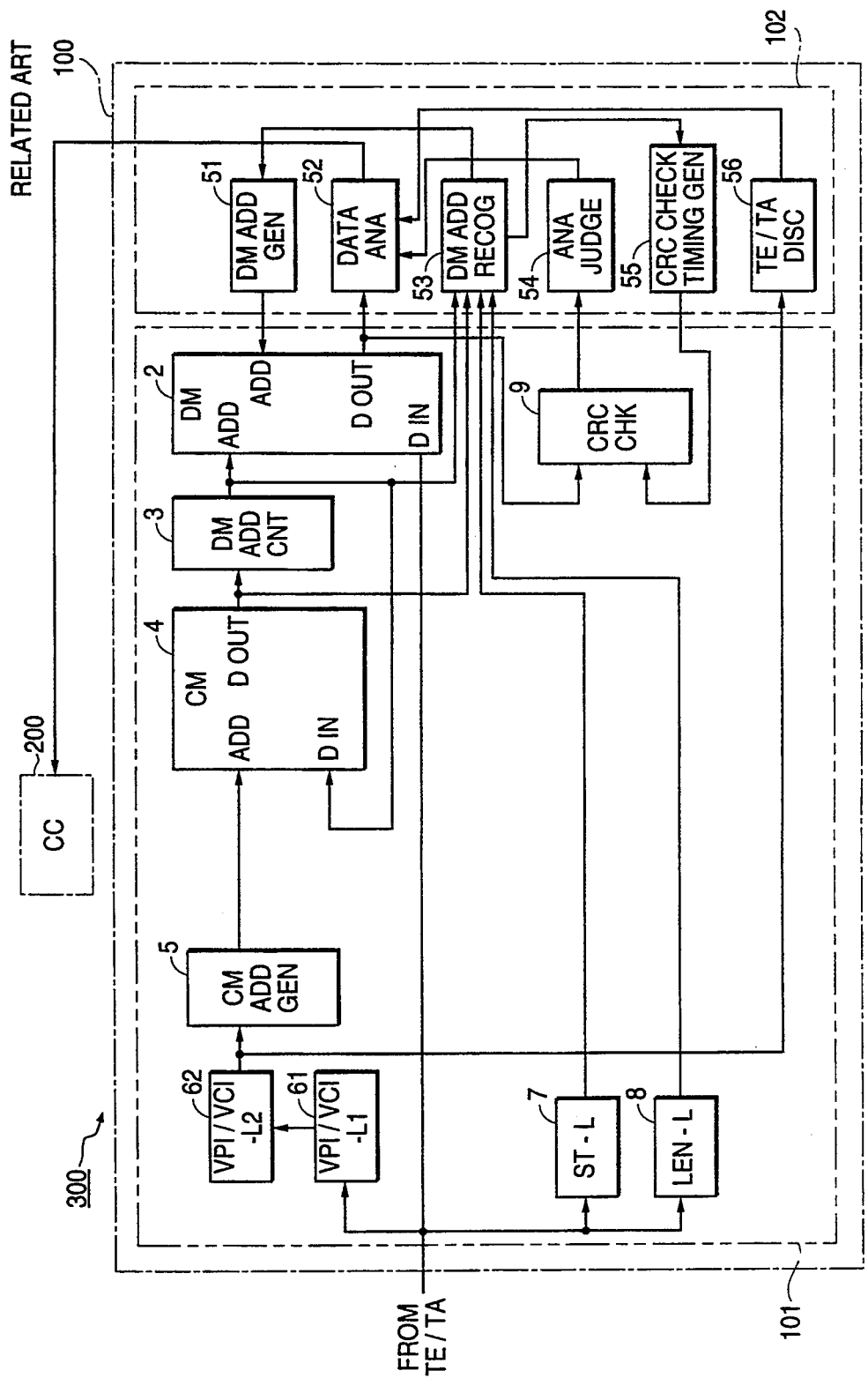
FIG. 2 is a schematic block diagram of a signaling data receiving and processing unit of the related art.
Figure 4:
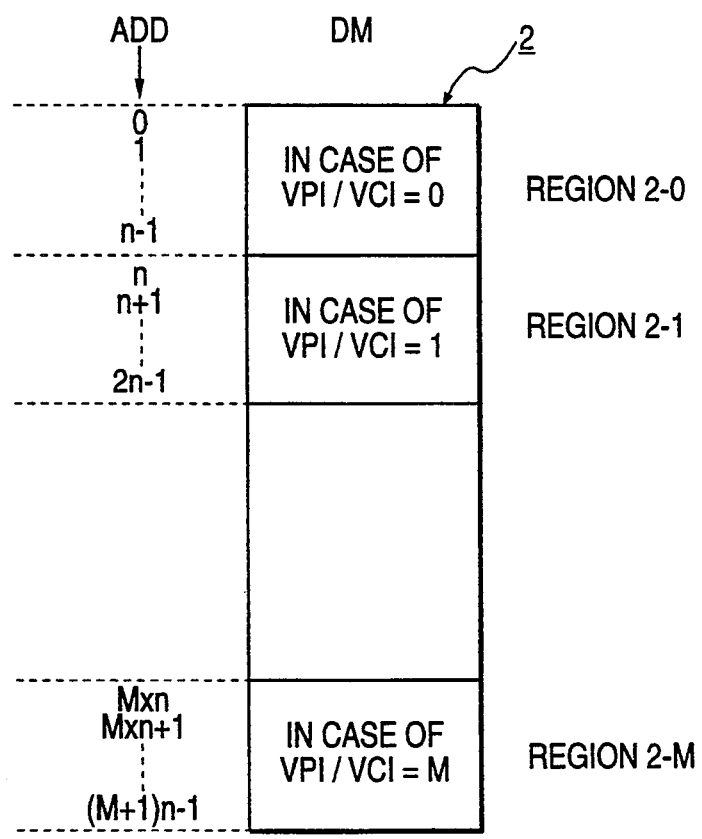
FIG. 4 illustrates a data storing state of a data memory provided in the signaling data receiving and processing unit of the related art.

In FIG. 6, CM 4' and DM 2' are functionally the same as CM 4 and DM 2 in FIG. 2, and CRCM 11, a CRC matching unit (CRC MCH) 12, a CRC code calculator (CRC CAL) 13, a second selector (2nd SEL) 14, a CRCM address generator (CRCM Add GEN) 15, a data flip-flop (DATA FF) 16 and a first selector (1st SEL) 17 are new.

The DM 2' is functionally same as DM 2 in the related art but has less memory regions in comparison with DM 2. The DM 2' provides memory regions as many as 2K, as shown in FIG. 8, having "n" addresses for each region. Different from DM 2, the number 2K of the memory regions in DM 2' is much less than the number M+1 of the memory regions in DM 2. When a TE sends a signaling datum to SIG DATA R/P 100', one of the 2K memory regions is used only for the signaling datum transferred because the VPI/VCI is already allocated by CC 200.

Different from CM 4 having 2 address regions in the related art, CM 4' provides 4 address regions for each TE, as shown in FIG. 9. In FIG. 9, 2 address regions saying "DM Start Add" and "DM work Add" are used in the same way as the address regions in FIG. 5. However, another region labeled "CRC Check Result" in FIG. 9 is used for temporarily storing a CRC calculation result, which will be discussed in detailed later. Still another region is left as an unused region.

Different from the CRC check in the related art, a CRC check in the present invention is performed by newly providing CRCM 11, CRC MCH 12, CRC CAL 13, 2nd SEL 14 and CRCM Add GEN 15 and by making CM 4' include the memory region for storing a CRC calculation result from CRC CAL 13 as mentioned above.

The CRC CAL 13 performs the CRC check calculation. In CRC CAL 13, a temporal CRC calculation result is produced by performing a CRC calculation an every byte of a divided signaling datum and a CRC calculation result, of the divided signaling data transferred in a unit of the cells, is produced by accumulating the temporal CRC calculation results each read from CM 4' one by one. The temporal CRC calculation result is stored in CM 4' through SEL 14 additionally provided to CM 4'. The SEL 14 is for selecting the temporal CRC calculation result sent from CRC CAL 13, so as to make CM 4' store the calculation result temporarily. The CRCM 11 stores the calculation results from CRC CAL 13 as shown in FIG. 10, which will be discussed in detail later.

The time chart in FIG. 7 is provided under or illustrates the same condition as in FIG. 2. That is, the time chart in FIG. 7 is provided in case where a signaling datum is divided into a first divided signaling datum composed of 14 bytes and a second divided signaling datum composed of 12 bytes and the two divided signaling data are transferred in a unit of a head cell and a last cell respectively, from a TE designated by "M" of VPI/VCI.

When signaling data cells are transferred to R-BLOCK 101' as shown in FIG. 7(a), ST-L 7 produces or outputs "head cell" and "last cell" as shown in FIG. 7(b) and VPI/VCI-L1 61 and VPI/VCI-L2 62 produce signal "M", respectively, as shown in FIGS. 7(c) and 7(d). The output "M" is sent to CM Add GEN 5 in which CM addresses, "4M", "4M+1" and "4M+2", shown in FIG. 9 are generated and firstly "4M+2" corresponding to "CRC Cal Result" is output to CM 4' through a first selector (1st SEL) 17 shown in FIG. 6, as shown in FIG. 7(f). Receiving "4M+2", CM 4' outputs the temporal CRC calculation result as shown in FIG. 7(g). Wherein, the temporal CRC calculation result is represented as "CRC" in FIG. 7(g). However, the entire "CRC" cannot be obtained at such an initial time when receiving the head cell. This is overcome by applying the output from ST-L7 to CRC CAL 13 as shown in FIG. 6. Since ST-L, informing or indicating that the cell is the head cell, is applied to CRC CAL 13, CRC CAL 13 performs the CRC check calculation by ignoring the data sent from CM 4' at this point in time.

In accordance with the output "4M+1" from CM Add GEN 5, work address "A" is output from CM 4', as shown in FIG. 7(g), and loaded in DM Add CNT 3, so the counting is advanced in DM Add CNT 3, producing the output, "A+1" to "A+43", as shown in FIG. 7(h). Then, the first divided signaling datum of 44 bytes in the head cell is stored in DM 2' in accordance with the DM addresses "A" to "A+43" output from DM Add CNT 3, during an interval marked (the first) in FIG. 7(j) which is the same as the related art.

In parallel with the above step, the CRC calculation results are sent to CRCM 11 during an interval marked (the first) in FIG. 7(p) and stored in CRCM 11, as shown in FIG. 10, in accordance with the output addresses from CRCM Add GEN 15, which is for generating addresses for CRCM 11, "0" to "43", as shown in FIG. 7(n). In CRCM 11, a CRC calculation result (first calculation result) for the first byte of the first divided signaling datum is stored in address "0", a calculation result (second calculation result) obtained by accumulating a CRC calculation result for the second byte with the 1st calculation result is stored in address "1", and such accumulation and storing are continued until a calculation result (44th calculation result) obtained by accumulating the calculation results of the 1st byte to 44th byte is stored in address 43, as shown in FIG. 10. The 44the calculation result is stored in address "4M+2" in CM 4', shown in FIG. 9 at a time marked (a) in FIG. 7(m).

The renewal concerning or updating the work address is performed the same way as in the related art at the time marked (b) in FIG. 7(l).

The operation for the last cell is performed almost same as that of the head cell. Since CM Add GEN 5 output "4M+2" to CM 4', as shown by representing "4M+2" at the beginning of "last cell" in FIG. 7(f), the CRC calculation result is output from CM 4' to CRC CAL 13, as shown in FIG. 6, and this is shown by "CRC" represented at the beginning of "last cell" in FIG. 7(g). In this case, since ST-L 7 produces the output of "last cell" as shown in FIG. 7(b), CRC CAL 13 does not ignore the CRC calculation result from CM 4'. As a result, the CRC calculation is continued in CRC CAL 13, in the same way as is done in case of the head cell. However, in the case of the last cell, since the CRC calculation result of the first divided signaling datum is temporarily stored in CM 4' and CRC CAL 13 uses the temporarily stored result as the base of the succeeding calculation, the CRC calculation for the second divided signaling datum is performed by accumulating the CRC calculation result of the second divided signaling datum onto the CRC calculation result of the first divided signaling datum. Therefore, it can be said that the CRC check calculation for the signaling datum can be continued no matter how many the signaling datum the divided signaling data is divided into.

The CRC calculation is continued by CRC CAL 13 and the calculation results are stored in CRCM 11 continually during an interval marked (the second) in FIG. 7(p) in accordance with the address output "0" to "43"

from CRCM Add GEN 15 as shown in FIG. 7n, until the second divided signaling datum is over or completely processed. The CRC calculation result of the second divided signaling datum is stored at CM address "4M+2" in CM 4' at a time (c) in FIG. 7(m).

After the CRC calculation result of the signaling datum is stored in CM 4', the CRC matching is performed in CRC MCH 12. Before explaining the CRC matching, data concerning the CRC matching will be explained below.

The second divided signaling datum is composed of 12 bytes. Describing the 12 bytes more precisely, the last byte of the signaling datum is the 11th byte and the 12nd byte is the CRC code for the signaling datum. Therefore, usually, the CRC check is performed by comparing the CRC calculation result of the signaling datum till 11th byte with the CRC code of 12th byte. However, in the present invention, the CRC check is performed by using a feature of the CRC checking in which the total sum of the CRC calculation result and the CRC code is a constant when no error occurs. Therefore, in the present invention, the CRC calculation is performed until the 12th byte of the second signaling datum is over. Therefore, the CRC calculation result for the last cell includes the total sum of the usual CRC calculation result and the CRC code. The CRC calculation for the last cell is stored in address 11 in CRCM 11 in accordance with the address output "11" from CRCM Add GEN 15. The CRCM address "11" is produced in CRCM Add GEN 15 by reducing "1" from "12" which is the input from LEN-L 8 and recognizing that the present cell is the last cell from the input from ST-L 7. The address output "11" is shown by "11" in FIG. 7(n).

Then, the CRC matching is performed in CRC MCH 12 by taking or performing a matching comparison between the CRC calculation result of the signaling datum read from address 11 of CRCM 11 and the constant value previously provided in CRC MCH 12. The output of ST-L 7 is used in CRC MCH 12 for allowing CRC MCH 12 to perform the CRC matching. In case of CRC MCH 12, the timing signal for performing CRC check is not necessary in particular as required in the related art. The CRC matching is performed at a time marked (f) in FIG. 7(q). The CRC matching result is sent to ANA JUDGE 54. After the output result from ANA JUDGE 54 is good, the analysis of the original signaling datum is started at a time marked (g) in FIG. 7(r). If the output result from ANA JUDGE 54 is NG, the analysis can be stopped before the analysis starts. This will be seen by comparing the start time (g) in FIG. 7(n) and the start time (b) in FIG. 3(l).

The detailed explanation of the storage of the signaling datum into DM 2' in cooperation with CM 4' will be explained below.

Generally, when TE transfers data in the data transfer system, TE requires a network, e.g. DEX 300, in the data transfer system to send the designated VPI/VCI. Replying to the requirement or request, the network, which will be described DEX 300 for simplicity hereinafter, sends the designated VPI/VCI to TE. At this time, the requirement and reply message are transferred in a unit of cells, using a special VPI/VCI. In the present embodiment, not depicted in FIG. 6 however, SIG DATA R/P 100 distinguishes the special VPI/VCI and sends it to CC 200. Then, CC 200 produces the designated VPI/VCI and sends it to TE. The action of such requirement or request and reply of VPI/VCI between TE and CC 200 is generally called "Meta-Signaling". After the Meta-Signaling is over, TE transfers the signaling datum in a unit of cells included in or using the designated VPI/VCI. In the above, the designated VPI/VCI is, namely, the VPI/VCI described in the prior explanation.

The Meta-Signaling is always performed by CC 200 whenever TE makes communication through CC 200. Therefore, when TE sends the signaling datum to SIG DATA R/P 100, the VPI/VCI is known in or by CC 200. The use of the Meta-Signaling data in CC 200 is a point of the present invention regarding the memory capacity of DM 2'.

There is an assumption that in DM 2', the memory addresses from "0" to "x−1" are already assigned to other TEs and 500 addresses are allocated to each TE as shown in FIG. 8. This assumption is, of course, kept in CC 200 in the matter of the Meta-Signaling.

When CC 200 assigns "J" of VPI/VCI for a TE, the CM addresses become 4J to 4J+3 as seen from FIG. 9. It is not necessary to consider 4J+2 and 4J+3, because 4J+2 is an address for the CRC check and 4J+3 is not used. Furthermore, in accordance with the assumption, no datum is stored in the memory regions larger than "x". As a result, when a signaling datum is transferred to SIG DATA R/P 100 in a unit of cells each including "J" of VPI/VCI, 4J for "DM Start Add" and 4J+1 for "DM Work Add" are allocated as CM addresses in CM 4', and "x" is stored to 4J and 4J+1 respectively. This is performed by first SEL 17 and second SEL 14 in FIG. 6, respectively. The 1st SEL 17 selects 4J and 4J+1 from CC 200 so as to send the 4J and 4J+1 to Add of CM 4', and 2nd SEL 14 selects "x" from CC 200 so as to send the "x" to Din of CM 4'. Because of the above selections, when a cell including VPI/VCI of "J" is sent to SIG DATA R/P 100', the divided signaling datum is stored from address "x" to "x+499" in DM 2' as shown in FIG. 8. If CC 200 allocates another new VPI/VCI to another TE, the divided signaling datum in a cell including the new VPI/VCI is stored into addresses succeedingly from address "x+500".

As illustrated in the above explanation, since the number of the memory regions is limited only to the number of TEs having VPI/VCI allocated by CC 200, the memory regions of DM 2' can be decreased to be as small as or proportional to the number of TEs actually having VPI/VCIs assigned.

A data flip-flop (DATA FF) 16 provided in SIG DATA R/P 100' in FIG. 6 is for adjusting timing of the signaling data (or the divided signaling data) to be loaded into DM 2' and CRC CAL 13 respectively.

The renewals of "work address" and "start address" in CM 4' are performed at the time (d) in FIG. 7(l) and the time (e) in FIG. 7(k) respectively, which is the same as explained in the related art.

What is claimed is:

1. A signaling data receiving and processing unit provided in a digital exchange of a broadband integrated services digital network, said digital exchange being connected with terminal equipment operating in a narrow band integrated services digital network and transferring signaling data to said signaling data receiving and processing unit asynchronously in a unit of a plurality of data cells each including divided signaling data obtained by dividing the signaling data, said signaling data receiving and processing unit being for sending analyzed information with respect to the signaling data to a central controller of the digital exchange, said signaling data receiving and processing unit comprising:
- volatile data memory means for volatilly storing the signaling data sent from the terminal equipment to the signaling data receiving and processing unit; and
- error check means for error checking of the signaling data transferred from the terminal equipment to the signaling data receiving and processing unit, while said signaling data is being stored in said data memory means.

2. A signaling data receiving and processing unit provided in a digital exchange of a broadband integrated services digital network, said digital exchange being connected with terminal equipment operating in a narrow band integrated services digital network and transferring signaling data to said signaling data receiving and processing unit asynchronously in a unit of a plurality of data cells each including divided signaling data obtained by dividing the signaling data, said signaling data receiving and processing unit being for sending analyzed information with respect to the signaling data to a central controller of the digital exchange, said signaling data receiving and processing unit comprising:
- data memory means for storing the signaling data sent from the terminal equipment to the signaling data receiving and processing unit; and
- error check means for error checking of the signaling data transferred from the terminal equipment to the signaling data receiving and processing unit, while said signaling data is being stored in said data memory means said error check means comprising:
- calculation means for calculating an error check code for every byte of the divided signaling data, accumulating a result of said calculation as the bytes are received, outputting a result of said accumulation as the result is accumulated, calculating an error check code for every byte of succeeding divided signaling data when the error check code calculation of preceding divided signaling data is complete, and continuing said calculation, accumulation and outputting until said calculation for every byte of the signaling data is complete, including for the calculating a cyclic redundancy code which is a last byte of the signaling data;
- result memory means for storing the result of said accumulation output by said calculation means;
- storage means for storing a result of said accumulation for every byte of the divided signaling data every time said accumulation of every byte of the divided signaling data is complete, reading and outputing the result stored in said storage means from said storage means to said calculation means; and
- matching means for performing matching between said accumulated result for every byte of the signaling data and a constant value determined responsive to a cyclic redundancy check system.

3. A signaling data receiving and processing unit according to claim 2, further comprising:
- analysis means for producing the analyzed information responsive the signaling data read from said data memory means; and
- judging means for judging whether the analysis by said analysis means should start at a beginning of the analysis responsive to a matching result from said matching means.

4. A signaling data receiving and processing unit provided in a digital exchange of a broadband integrated services digital network, said digital exchange being connected with terminal equipment operating in a narrow band integrated services digital network and transferring signaling data to said signaling data receiving and processing unit asynchronously in a unit of a plurality of data cells each including divided signaling data obtained by dividing the signaling data, said signaling data receiving and processing unit being for sending analyzed information with respect to the signaling data to a central controller of the digital exchange, said signaling data receiving and processing unit comprising:
- data memory means for storing the signaling data sent from the terminal equipment to the signaling data receiving and processing unit, said data memory means comprising memory regions for storing the signaling data corresponding to the terminal equipment having identification information allocated by the central controller in reply to requests from the terminal equipment; and
- error check means for error checking of the signaling data transferred from the terminal equipment to the signaling data receiving and processing unit, while said signaling data is being stored in said data memory means.

5. A signaling data receiving and processing unit according to claim 4, further comprising provision means for providing access address information for the memory regions to said data memory means responsive to the identification information sent from the central controller, before the signaling data is sent from the terminal equipment to the signaling data receiving and processing unit.

6. A signaling data receiving and processing unit according to claim 5, wherein said provision means comprises control memory means for providing the access address information by storing address signals in said control memory means in accordance with the identification information sent from the central controller.

7. A data receiving and signalling processing unit of a digital signalling data exchange network providing an integrated services digital network transmission service for narrow band asynchronous signaling data having bytes of data transferred as a data unit, said processing unit comprising:
- volatile memory means for the receiving and volatilly storing the bytes of the unit of signaling data; and
- error check means for error checking the bytes as the bytes are received and stored and producing an accumulating error check indication prior to receipt of all of the unit.

8. A processing unit as recited in claim 7, further comprising:
- means for determining a number of terminal equipment units connected to the network; and
- allocation means for allocating portions of said memory means for storing the bytes corresponding to the number of terminal equipment units connected to the network.

9. A processing unit as recited in claim 7, further comprising processing means for processing all of the data unit responsive to the error check indication.

10. A method of error checking of asynchronous signaling data transmitted in a narrow band integrated services digital network channel, comprising:

(a) storing bytes of the signaling data as they are received in a volatile memory; and
(b) performing an error check on the bytes as they are stored in the volatile memory.

11. A method as recited in claim 10, further comprising allocating memory for storing the signaling data as needed for storage.

12. A method as recited in claim 10, further comprising (c) processing the signaling data responsive to the error check.

* * * * *

UNITED STATES PATENT AND TRADEMARK OFFICE
CERTIFICATE OF CORRECTION

PATENT NO. : 5,369,649
DATED : November 29, 1994
INVENTOR(S) : Murayama et al.

It is certified that error appears in the above-indentified patent and that said Letters Patent is hereby corrected as shown below:

Column 7, line 34, after "calculation" delete "an" and insert --on--.
Column 9, line 21, after "constant" insert --value--.

Signed and Sealed this

Twenty-first Day of March, 1995

Attest:

BRUCE LEHMAN

Attesting Officer         Commissioner of Patents and Trademarks